Patented Nov. 4, 1930

1,780,198

UNITED STATES PATENT OFFICE

HANS LEHRECKE, OF FRANKFORT-ON-THE-MAIN, GERMANY, ASSIGNOR TO THE ROESSLER & HASSLACHER CHEMICAL COMPANY, OF NEW YORK, N. Y., A CORPORATION OF DELAWARE

PROCESS FOR STABILIZATION OF HYDROCYANIC ACID

No Drawing. Application filed June 23, 1926, Serial No. 118,090, and in Germany July 3, 1925.

The object of this invention is to stabilize liquified hydrocyanic acid against polymerization and decomposition and relates to the use of ionizable or hydrolyzable salts or compounds for this purpose.

The stabilization of liquid hydrocyanic acid has previously been accomplished by the addition of mineral acids such as sulphuric and hydrochloric. These methods have not however been wholly satisfactory.

I have now found that a much more satisfactory method is to add to the liquid hydrocyanic acid salts or other acid products which are capable of hydrolysis or ionization. Such salts are for example the halides of antimony, aluminium, lead, zinc, arsenic etc., for example, lead tetrachloride, zinc chloride arsenic trichloride and the like; or salts which in the presence of water are strongly hydrolyzed such as zinc chloride, iron chloride and the like. Further I have also used easily saponifiable organic esters of organic or inorganic acids. Thus I have used the alkyl esters of hydrochloric, sulphuric, boric and oxalic acids, halogen substituted esters such as the bromacetic esters, organic salts such as ethyl sulphate, acid chlorides such as acetyl chloride and the like. Other halogen compounds which have given good results are carbon tetrachloride, chloroform, trichlor-ethylene, cyanogen chloride and chloropicrin. Various combinations of the above substances have also proven valuable in special cases. In all cases it has been found that small amounts of the stabilizing material were sufficient to give excellent results. The quantities necessary for producing a lasting stabilizing effect depend partly upon the amount of water contained in the hydrocyanic acid, partly upon the purity of the acid and further upon the action of the container in which the mixture is stored. In some cases 0.5 to 1% of the stabilizing material is necessary for a successful stabilization, whilst in others as much as 5% are required.

Suitably stabilized hydrocyanic acid mixtures are illustrated by the following examples (when hydrocyanic acid containing 2 to 6% of water is used)

1. 98% HCN 2% ethyl sulphate;
2. 99% HCN 1% aluminium chloride;
3. 99.5% HCN 0.5% chloropicrin;
4. 98% HCN 2% cyanogen chloride;
5. 97% HCN 3% chlorocarbonic acid methyl ester;
6. 98% HCN 2% bromacetic ethyl ester.

The stabilizing materials of this invention are then characterized by their ability to ionize or hydrolyze and thus form a radical of acid reaction or an active acid compound. Liquid hydrocyanic acid stabilized with materials of this invention will keep clear and bright and is not discolored for more than half a year when kept in vessels of a non-alkaline nature such as quartz, resistance glass and the like.

Claims:

1. Process for stabilizing liquid hydrocyanic acid against polymerization or decomposition which comprises adding to said hydrocyanic acid an inorganic compound of a strong acid capable of hydrolysis under the conditions of storage of liquid HCN.

2. A process for stabilizing liquid hydrocyanic acid against polymerization or decomposition which comprises adding to said hydrocyanic acid an inorganic salt of a strong acid capable of hydrolysis under the conditions of storage of liquid HCN.

3. Process for stabilizing liquid hydrocyanic acid against polymerization or decomposition which comprises adding to said hydrocyanic acid an inorganic compound of a halogen acid capable of hydrolysis under the conditions of storage of liquid HCN.

4. Process for stabilizing liquid hydrocyanic acid against polymerization or decomposition which comprises adding to said ydrocyanic acid an inorganic salt of hydrochloric acid capable of hydrolysis under the conditions of storage of liquid HCN.

5. A mixture comprising liquid hydrocyanic acid and an inorganic compound of a strong acid capable of hydrolysis under the conditions of storage of liquid HCN.

6. A mixture comprising liquid hydrocyanic acid and from 0.5 to 5% of an inorganic compound of a strong acid capable of hydrolysis under the conditions of storage of liquid HCN.

7. Process for stabilizing liquid hydrocyanic acid against polymerization or decomposition which comprises adding to said hydrocyanic acid a small amount of aluminium chloride.

8. Process for stabilizing liquid hydrocyanic acid against polymerization or decomposition which comprises adding to said hydrocyanic acid 0.5 to 5% by weight of aluminum chloride.

9. A mixture comprising liquid hydrocyanic acid and from 0.5 to 5% of aluminum chloride.

10. Process for stabilizing liquid hydrocyanic acid against polymerization or decomposition which comprises adding to said hydrocyanic acid a compound selected from the group comprising the halides of antimony, aluminum, lead, zinc, arsenic, and iron, capable of hydrolysis under the conditions of storage of liquid HCN.

11. A mixture comprising liquid hydrocyanic acid and an inorganic compound selected from the group comprising the halides of antimony, aluminum, lead, zinc, arsenic, and iron, capable of hydrolysis under the conditions of storage of liquid HCN, as a stabilizer.

12. A mixture comprising liquid hydrocyanic acid and from 0.5 to 5% by weight of said hydrocyanic acid of an inorganic compound selected from the group comprising the halides of antimony, aluminum, lead, zinc, arsenic, and iron, capable of hydrolysis under the conditions of storage of liquid HCN.

Signed at Frankfort-on-the-Main, Germany, this 5th day of June, A. D. 1926.

HANS LEHRECKE.